T. JOHNSON.
MOP HOLDER.
APPLICATION FILED MAY 27, 1915.
1,163,824.
Patented Dec. 14, 1915.
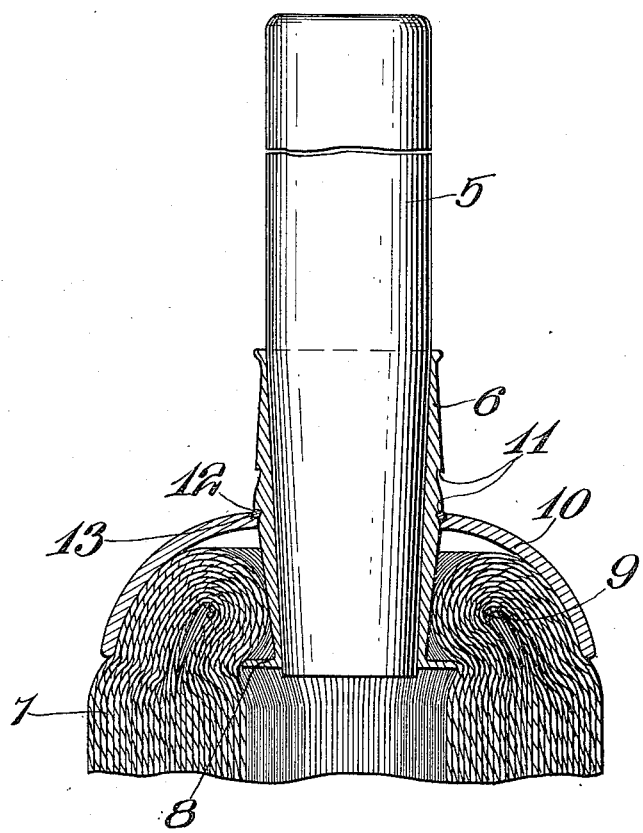
Theodore Johnson
INVENTOR.
BY
ATTORNEYS.

UNITED STATES PATENT OFFICE.

THEODORE JOHNSON, OF CHICAGO, ILLINOIS.

MOP-HOLDER.

1,163,824.

Specification of Letters Patent.

Patented Dec. 14, 1915.

Application filed May 27, 1915. Serial No. 30,776.

*To all whom it may concern:*

Be it known that I, THEODORE JOHNSON, a citizen of the United States, residing at Chicago, in the county of Cook and State of Illinois, have invented certain new and useful Improvements in Mop-Holders, of which the following is a specification.

This invention relates to mops for spreading tar or paint on roofs and other surfaces.

The invention has for its object to provide a holder for the mop which clamps the same firmly and is adjustable to suit mops of different sizes.

The invention is illustrated in the accompanying drawing in which a vertical section of the invention is shown.

The device comprises a handle 5 which is suitably secured in a socket member 6 on which the mop 7 is mounted. The socket member is a sleeve which tapers slightly toward its outer end to facilitate the securing of the handle. The sleeve is provided with an outstanding, annular flange 8 at its outer end, said flange forming a shoulder or abutment against which the mop is clamped. The mop 7 is formed of strands of cotton or other suitable material, and is mounted on the sleeve 6 close to the flange 8. It is drawn tight around the sleeve by encircling wire rings 9. The intermediate portions of the strands pass through the rings and the ends extend outward from the sleeve. A concavo-convex clamping ring 10 is slidably mounted on the sleeve. The mop is located between said ring and the flange 8, and the concave side of the ring faces the mop. The sleeve has a plurality of annular shoulders 11 located a suitable distance from the flange 8. A split locking ring 12, of wire, is interposed between one of the shoulders 11 and the clamping ring to form a stop for the latter. By providing a plurality of shoulders 11 mops of varying thickness may be clamped. The clamping ring is rabbeted as indicated at 13. The locking ring 12 seats in the rabbet and is thus prevented from expanding and slipping past the shoulder 11.

In assembling the device, the mop material 7 is first placed around the sleeve and secured by the rings 9; then the clamping ring 10 is forced down on the mop till it clears one of the shoulders 11, whereupon the locking ring 12 is slipped over the sleeve and placed against the shoulder. The clamping ring is now released, when it will move back till it is stopped by the locking ring.

I claim:—

1. A socket member having a shoulder, a mop mounted on the socket member, a clamping ring slidably mounted on the socket member, a second shoulder on the socket member, and locking means for the clamping ring engaging the last-mentioned shoulder.

2. A socket member having a shoulder, a mop mounted on the socket member, a clamping ring slidably mounted on the socket member, a second shoulder on the socket member, and a locking ring interposed between the last-mentioned shoulder and the clamping ring.

3. A socket member having a shoulder, a mop mounted on the socket member, a clamping ring slidably mounted on the socket member, said clamping ring having a rabbet, a second shoulder on the socket member, and a locking ring seating in the rabbet of the clamping ring and engaging the last-mentioned shoulder.

In testimony whereof I affix my signature in presence of two witnesses.

THEODORE JOHNSON.

Witnesses:
S. J. LEHRER,
H. G. BATCHELOR.

Copies of this patent may be obtained for five cents each, by addressing the "Commissioner of Patents, Washington, D. C."